Patented Apr. 15, 1941

2,238,777

UNITED STATES PATENT OFFICE 2,238,777

PROTECTION OF METAL VAPOR LAMP BULBS AND THE LIKE FOR ALKALI METAL ATTACK

Eugene Lemmers, Cleveland, and Raymond W. Goodwin, Cleveland Heights, Ohio, assignors to General Electric Company, a corporation of New York No Drawing. Application August 23, 1934, Serial No. 741,144

6 Claims. (Cl. 91—70)

This invention relates to gaseous or vapor electric discharge devices containing alkali metal, and operating at temperatures at which such metal attacks glass,—such as sodium vapor lamps, in particular. Ordinary glass and many special glasses that are otherwise desirable material for the envelopes (or for the internal parts) of alkali metal vapor lamps are discolored and blackened when exposed to the hot metal vapors, thus becoming virtually impervious to light. This is true both of the ordinary glass commonly used for the bulbs of incandescent filament electric lamps, and of the borosilicate or Pyrex glass often preferred for sodium vapor lamps. Special glasses that otherwise seem to promise a solution of the difficulty have proved difficult to work as required in making lamps commercially, and may present other special problems. "Cased" or "composite" glasses, comprising an inner layer of resistant glass and an outer layer of more ordinary or workable glass, present many of the difficulties of the resistant glasses in bulb and lamp manufacture, and are objectionable in various other ways.

We have found that alkali metal attack on non-resistant glass of vapor-electric discharge devices can be prevented by a mere film of a boric oxide glaze on its surface, applied after the non-resistant glass has been made into a bulb or other lamp part. Practically any glass desirable for lamp manufacture can be treated and protected in this way. The coverage really required is so exceedingly thin that thickness is hardly to be thought of in connection with it. In application and properties, however, the coating resembles a glaze, being fused over the glass bulb or part at a temperature which need not fuse or even materially soften the glass.

The essential material of our glaze is boric oxide, which may be used either without or with commixture of other ingredients. Quite aside from diluent additions,—which merely reduce the amount of boric oxide used for the sake of economy, or for other collateral purposes,—we have found that other ingredients can be combined with boric oxide with decidedly beneficial effects on the properties of the glaze. This is especially important as regards stability of the glaze against absorption of moisture or "weathering," and against vaporization under the heat encountered in the making and operation of sodium or other alkali metal vapor discharge devices. Also, ingredients combined with boric oxide as diluents or to stabilize the glaze may require addition of other ingredients to counteract undesired collateral effects of the diluent or stabilizing ingredients on other properties of the glaze,—such as its melting point, its flowing and spreading over the glass when fused thereon, its transparency, its coefficient of expansion and its adhesion, etc.

Ingredients which tend to stabilize a boric oxide glaze against weathering and against vaporization of boric oxide under heat (i. e., restrain vaporization of boric oxide, and so reduce its vapor tension) include oxides of the metals of the second periodic group, particularly oxides of the alkaline earth metals. Barium and strontium oxides are preferred to calcium oxide, which tends to raise its melting point too much. Aluminum oxide may also be used (in whole or in part) in lieu of alkaline earth oxides for this purpose, or may be added to reduce the proportion of boric oxide in the glaze. Alumina does not have the unfavorable effects of large percentages of alkaline earth oxides, which cause the glaze to flow and spread less well when fused, and also tend to render it somewhat hazy by transmitted light; but too much alumina in the glaze does tend to raise its softening or melting point too high, and alumina also tends to lower its coefficient of expansion. Silica stabilizes boric oxide against vaporization, and also tends to render the glaze resistant to moisture,—thus preventing cloudiness from weathering,—and also influences favorably its flowing when fused, and its transparency. Caution in the use of silica is necessary, inasmuch as in many cases glazes containing it tend to blacken, or crack, etc.,—especially if the percentage of it is high. In small percentages, silica seems to be protected from discoloring attack of alkali metal vapor by the bulk of other materials, and hence may be sparingly used to advantage. In general, a variety of oxides in the glaze seems favorable to its stability; i. e., it is desirable to use a number of the different oxides here indicated.

Ingredients which may be used in a boric oxide glaze to improve its properties or counteract the effects of stabilizing ingredients on them include oxides of the metals of the first periodic group, and particularly the alkali metals,—sodium and potassium oxides being preferred. They serve as fluxes and tend to lower the fusion point of the glaze, tend to render or keep it transparent, and may be used and varied to control and vary its coefficient of expansion.

Oxides of phosphorus may be used as additional acid oxide constituents of a boric oxide glaze, and as substitutes for boric oxide to a limited extent. Fluorine in any of its compounds that might be used would also be regarded as an acid constituent. All the other oxides hereinbefore mentioned are to be considered basic, excepting alumina, which is regarded as neutral. These distinctions are not too important, however, since experience shows that the ratio of mols of acid oxides to mols of basic oxides may vary over a wide range.

The exact constituents and formula of a satisfactory stabilized boric oxide glaze may also vary very widely. Without attempting to state theoretical limits, we may say that we have successfully used proportions (by weight) of boric oxide ranging from about 90% down to about 35%; of stabilizing oxides ranging from about 4% up to about 50%; of alkali metal oxides from about 3% to 15%; of phosphorus pentoxide ($P_2O_5$) about 4%. Ordinarily, we prefer that the proportion of barium oxide in a glaze should not greatly exceed 10%, on account of its usual effects on the spreading of the glaze when fused and on its transparency. We also generally prefer that the proportion of sodium oxide ($Na_2O$) should not greatly exceed 10%, on account of the relatively high rate of expansion of the glaze usually produced by a much larger proportion. An excessive melting point of the glaze is apt to result in a foggy effect, because the bulb or other part to be glazed cannot be heated high enough to fuse and spread a high-melting glaze properly.

While we have mentioned boric oxides and other oxides as glaze materials or ingredients, it is to be understood that this refers to the composition of the final glaze on the bulb or other part, and not to the form in which such oxides are embodied as raw materials or batch ingredients. For example, boric oxide may be used in any one or more of such forms as anhydrous boric oxide ($B_2O_3$), boric acid ($H_3BO_3$), borax ($Na_2B_4O_7$), or barium borate ($Ba(BO_2)_2$); barium oxide as such or as barium hydrate ($Ba(OH)_2$), barium carbonate ($BaCO_3$), or barium nitrate ($Ba(NO_3)_2$); and other ingredients in like variety of forms. For aluminum oxide, cryolite ($Na_3AlF_6$) has been found a very good batch material. In general, the raw or batch materials may be any which under the heat which they undergo in practice lose all constituents save such as form desired or unobjectionable ingredients in the final glaze.

Common ingredients of glasses which should generally be avoided in our boric oxide glaze include compounds (particularly oxides) of lead, zinc, cadmium, thallium, or iron. In any appreciable or substantial amounts, such compounds are generally attacked by hot alkali metal vapors held in contact with the glaze for any great length of time, and thus cause objectionable discoloration or blackening. So, in general, any compounds which may be decomposed by alkali metals or their hot vapors should be avoided or used only with caution,—as for example silica, already discussed.

In carrying out the invention, we apply the boric oxide glaze material over the bulb surface or other glass surface to be protected, and afterward heat the bulb or the like until the material forms a thin, transparent, adherent, fused film on the glass. The boric oxide material can be applied either from liquid suspension or from solution. Coating from solution is more especially adapted to boric acid used alone; coating from suspension is equally adapted to boric acid, or to boric oxide used alone, or to composite boric oxide glaze materials. To produce a protective film or glaze of boric oxide ($B_2O_3$) alone, we generally prefer to work with boric acid ($H_3BO_3$) as our raw material, rather than with boric oxide itself,—partly because boric acid is not hydroscopic or subject to weathering like boric oxide. When boric acid is used, heating converts it into boric oxide, so that the final result is a fused boric oxide glaze over the surface of the glass.

For coating a bulb or other glass part with boric acid (alone) from solution, the boric acid may be dissolved in (methyl) alcohol until saturated, which is in the proportion of one part boric acid to about 5 parts alcohol by weight. This solution may be poured into a bulb and shaken to bring the solution into contact with all of its interior surface that is to be glazed, and then removed; or, alternatively, the bulb or other surface to be glazed may be sprayed with the solution. The solution may then be "dried" on the surface by blowing dry air on it, thus producing a whitish coating.

For coating a bulb or the like with boric acid from suspension, a mixture of acetone and (methyl) alcohol in equal parts by weight may be used as the suspending liquid. One part of ordinary boric acid crystals and about 3 to 5 parts of the liquid (by weight) may be ball-milled together till a uniform suspension is produced, and this may be poured into the bulb or sprayed on the surface, etc., as in the use of the boric acid solution as described above.

The heating can be carried out in the air without any special precaution. Heating to temperature of about 600° C. suffices to convert boric acid to boric oxide, and to melt this oxide and cause it to flow over the surface of the glass in an even, transparent film which is usually not visible while kept away from moisture.

While the boric oxide glaze thus produced is quite hydroscopic, and becomes perceptibly cloudy in an hour when exposed to ordinarily moist atmospheric air, this susceptibility gives no trouble if the bulb or the like is used directly after the heating as described above. We have discovered, furthermore, that the boric oxide film can be rendered considerably less hydroscopic by heating the bulb or the like sufficiently above the fusion point of the boric oxide—so long, of course, as the glass article is not thereby softened out of shape and spoiled. For example, if Pyrex or borosilicate glass that has been glazed with boric oxide material is "super-heated" to the working temperature of the glass, instead of merely to around 600° C., some sort of effect which we refer to as "interfusion" is produced,—apparently involving a union or combination of the boric oxide with the glass, or some component of the glass,—and the resultant glaze is by no means so hydroscopic as when the article is only heated to the fusion point of boric oxide. In doing this it is often desirable to use a mold or other supporting means and sometimes a rotation of the glass to prevent deformation.

A boric acid coating on a bulb or other glass surface is not hydroscopic, so that bulbs and other parts can be coated with boric acid and kept on hand indefinitely in any quantities desired, always ready to be heat-treated when and as they are used. This would not be the case with a fused film of boric oxide, which after keeping any length of time would be partly or wholly converted to boric acid by absorption of atmospheric moisture, and would thus have to be heat-treated anew and reconverted to boric oxide before the article could be used for a lamp or the like. Even when the article had been "super-heated" to interfuse the boric oxide with the glass as described above, the article could not be kept on hand long without requiring to be reheated before use in lamp manufacture.

In the following examples of stabilized composite boric oxide glazes which have proved reasonably satisfactory under prolonged exposure to hot sodium vapor (250 to 300° C.), as well as in their stability, resistance to moisture, adherence, and transparency, etc., the (final) glaze composition is stated in percentages by weight:

| $B_2O_3$ | $Al_2O_3$ | BaO | $Na_2O$ | $K_2O$ | F | $P_2O_5$ |
|---|---|---|---|---|---|---|
| 35.0 | | 50.0 | 15.0 | | | |
| 73.0 | 4.7 | | 8.7 | 2.8 | 10.7 | |
| 79.3 | 2.3 | | 13.0 | | 5.4 | |
| 80.0 | 4.0 | 4.0 | 8.0 | | | 4.0 |
| 81.0 | 7.0 | 4.0 | 4.0 | 4.0 | | |
| 82.0 | 7.0 | 4.0 | 7.0 | | | |
| 82.0 | 11.0 | | 7.0 | | | |
| 87.0 | | 10.0 | 3.0 | | | |
| 88.1 | 2.3 | | 4.3 | | 5.3 | |

The fluorine in these formulae is due to the use of cryolite as a batch material for introducing alumina.

The following are the percentage compositions by weight of stabilized glazes which have proved even more satisfactory.

| $B_2O_3$ | $Al_2O_3$ | BaO | SrO | $Na_2O$ | $K_2O$ | $SiO_2$ |
|---|---|---|---|---|---|---|
| 70 | 7 | 3 | 3 | 4 | 8 | 5 |
| 70 | 5 | 10 | | | 10 | 5 |
| 77 | 7 | 3 | | 10 | | 3 |

The fluorine in these formulae is due to the use best of the whole twelve examples given.

These twelve examples illustrate the great variety of ingredients and proportions that may be used. Neither the proportions nor the ingredients stated in the formulae need be closely adhered to, however: the proportions may be varied, and substitutions of ingredients may be made. For example, sodium oxide in these formulae may be replaced, in whole or in part, with other alkali metal oxides, such as potassium oxide; and aluminum oxide may be used interchangeably with barium oxide or other alkaline earth oxide, in suitable amount.

To compound the glaze material, the proper amounts of the batch materials which it is desired to use are calculated from any of the foregoing formulae, in a manner well understood by chemists, and these amounts of the batch materials are mixed together fused or fritted, quenched in water and then dried and ground to powder. The mixture is then ball-milled with a liquid consisting of alcohol (methyl or ethyl) and diethyl carbonate for about sixteen hours. Substantially equal parts of alcohol and diethyl carbonate by weight may be used, and about 1 gram of the powder to 5 grams of the total liquid. The ball-milling produces thorough intermixture of the solid ingredients, reduces their particles to the necessary fineness, and produces a free-flowing uniform suspension, having about the consistency of rich milk. Diethyl carbonate may advantageously be used alone as the liquid constituent.

If the glass part or base to be treated is a Pyrex glass bulb, the liquid suspension produced as just described is poured into it so as to cover all of its surface that is to be glazed, and then poured out, whereupon the bulb is preferably allowed to drain in inverted position. Low-pressure air is then blown into it to dry it quickly, producing an even white, frosty coating. If the part treated is a lamp-stem flare, or a completed stem (of course without electrodes, etc.), it may be dipped in the liquid suspension and then drained and dried; or the liquid may be sprayed on it and dried.

The Pyrex bulb or other glass part, thus coated, is heated to about 725° C., close to the softening point of Pyrex glass. This converts to oxides any of the batch ingredients susceptible of such conversion, and fuses the coating material into a transparent, adherent, stable alkali-metal and moisture resistant protective film on the glass base. This heating may last as much as five minutes or so without deforming a Pyrex bulb.

In a similar way, a lime glass bulb or the like may be coated with the glaze material from the liquid suspension, and the coating fused into a film on it by heating to a temperature just below the deformation temperature of the glass.

What we claim as new and desire to secure by Letters Patent of the United States is:

1. A process of protecting the interior glass surfaces of an alkali metal vapor electric discharge-device against discoloration by the alkali metal, which process comprises coating the glass surfaces to be protected with glaze material consisting of boric acid, and heating the same until the boric acid is converted to boric oxide and the latter fuses to a transparent, adherent film on the glass surface.

2. A process of protecting the interior glass surfaces of an alkali metal vapor electric discharge-device against discoloration by the alkali metal, which process comprises coating the glass surfaces to be protected with glaze material consisting of boric acid, heating the same until the boric acid is converted to boric oxide and the latter fuses to a transparent, adherent film on the glass surface, and further heating to the working temperature of the glass.

3. A gaseous electric discharge device comprising an envelope of glass having an internal film of glaze thereon consisting of transparent boric oxide.

4. A sealed enclosure containing alkali metal vapor, comprising an envelope of glass having an internal film of glaze thereon consisting of transparent boric oxide.

5. The method of treating glass to make it resistant to discoloration by hot alkali metal vapors, which includes treating the surface of the glass with a solution of a boron compound which, on being heated, will leave a residue consisting of boric oxide and heating the glass to decompose the compound and fuse the boric oxide to the glass in a homogeneous substantially transparent layer.

6. A gaseous electric discharge device comprising an envelope of light-transmitting vitreous material which is deleteriously affected by operation of the discharge therein, said envelope having an internal film of glaze thereon consisting of transparent boric oxide.

EUGENE LEMMERS.
RAYMOND W. GOODWIN.

CERTIFICATE OF CORRECTION.

Patent No. 2,238,777.                               April 15, 1941.

EUGENE LEMMERS, ET AL.

It is hereby certified that error appears in the printed specification of the above numbered patent requiring correction as follows: Page 3, first column, line 38, for the words "The fluorine in these formulae is due to the use" read --The first of these last three glazes is rather the--; and that the said Letters Patent should be read with this correction therein that the same may conform to the record of the case in the Patent Office.

Signed and sealed this 13th day of May, A. D. 1941.

(Seal)

Henry Van Arsdale,
Acting Commissioner of Patents.